Patented Sept. 5, 1939

2,171,727

UNITED STATES PATENT OFFICE 2,171,727

PROCESS FOR THE PREPARATION OF β-METHYL ACROLEIN

Carl T. Kautter, Darmstadt, Germany, assignor to Röhm & Haas Company, Philadelphia, Pa.

No Drawing. Application April 22, 1936, Serial No. 75,763. In Germany May 18, 1935

7 Claims. (Cl. 260—603)

This invention relates to a process for oxidizing unsaturated aliphatic alcohols to the corresponding unsaturated aldehydes. It relates more particularly to the use of selenium dioxide or selenious acid as an oxidizing agent in this process.

Saturated alcohols are not oxidized by selenium dioxide and it was therefore surprising to find that the unsaturated alcohols could be oxidized to the corresponding aldehydes by means of this oxidizing agent.

It is an object of this invention to provide a method of preparing unsaturated aliphatic aldehydes by oxidizing the corresponding alcohol with selenium dioxide or selenous acid. It is a particular object to apply this method of oxidation to β-methyl allyl alcohol for the purpose of producing α-methyl acrolein.

The process may be carried out in the liquid phase on the unsaturated alcohol alone or the selenium dioxide may be dissolved or suspended in a suitable liquid. The saturated alcohols such as hexyl alcohol, ethers, dioxane, etc., are suitable solvents or suspension media for the selenium dioxide. The reaction is preferably carried out in a vessel equipped with a good stirring device so as to maintain the selenium dioxide in suspension if necessary. It is advantageous to remove the aldehyde from the reaction mixture as soon as possible after it is formed and to replace the alcohol which has been oxidized by fresh portions of the unsaturated alcohol. The reaction vessel should be equipped with a good fractionating column so that the reaction product may be distilled immediately in a fairly pure form. In order to obtain a fairly pure product any solvent used must have a boiling point higher than that of the aldehyde formed during the reaction. During the reaction the selenium dioxide is reduced leaving elementary selenium in the vessel which can then be oxidized and used again.

The process is best carried out at elevated temperatures so that the unsaturated aldehyde will evaporate from the reaction mixture as soon as it is formed.

The invention may be illustrated by the following examples but it is not confined to the exact conditions of temperature, solvent and relative quantities of reactants shown as it may be otherwise practised within the scope of the appended claims.

Example 1

20 parts of pure crystalline selenium dioxide is dissolved by gentle heating in 50 parts of hexyl alcohol and placed in a vessel equipped with a good fractionating column and a stirring device. In the course of an hour 26 parts of β-methyl allyl alcohol is introduced into the vessel and the contents heated. A precipitate of dark brown elementary selenium is formed. The temperature is so regulated that at the head of the fractionating column a distillate is obtained which boils between 63–70° C. 15 parts of a crude product is obtained which on repeated fractionation yields 13 parts of α-methyl acrolein boiling at 68–69° C. The yield of α-methyl acrolein is 51.3% of the theory.

Example 2

35 parts of selenious acid is mixed with 80 parts of dioxane and heated in a vessel, the undissolved parts of the selenous acid being kept in suspension by means of a stirrer. The solution is then heated to 90° C. and during the course of two hours 45.5 parts of β-methyl allyl alcohol is added. A precipitate of red elementary selenium is formed. The crude product distills over at 63–70° C. and this on repeated fractionation yields 26 parts of α-methyl acrolein boiling at 68–69° C. The yield of α-methyl acrolein is 59% of the theory.

Example 3

5 parts of β-methyl allyl alcohol are placed in a vessel equipped with a stirring device and a fractionating column. The alcohol is heated to 50° C. and in the course of an hour 32 parts of selenium dioxide is added in small portions. At the same time 37 parts of β-methyl allyl alcohol is added. The contents of the vessel is heated to 90° C. and held at that temperature. 27 parts of crude β-methyl acrolein distills over and yields on repeated fractionation 25.4 parts of pure β-methyl acrolein. The yield is 62% of the theory.

The present process is applicable to unsaturated alcohols other than the β-methyl allyl alcohol shown in the foregoing examples, such as, for instance, allyl alcohol, crotyl alcohol, etc.

I claim:

1. The process of preparing unsaturated aliphatic aldehydes which comprises oxidizing the corresponding unsaturated alcohol with one of the group consisting of selenium dioxide and selenous acid.

2. The process of preparing unsaturated aliphatic aldehydes which comprises oxidizing the corresponding unsaturated alcohol with one of the group consisting of selenium dioxide and selenous acid in the presence of a solvent inert to the oxidizing action of the selenium compound.

3. The process of preparing unsaturated aliphatic aldehydes which comprises oxidizing the corresponding unsaturated alcohol with one of the group consisting of selenium dioxide and selenious acid at a temperature at which the aldehyde distills as soon as it is formed.

4. The process of preparing α-methyl acrolein which comprises heating β-methyl allyl alcohol with one of the group consisting of selenium dioxide and selenious acid.

5. The process of preparing α-methyl acrolein which comprises heating β-methyl allyl alcohol with one of the group consisting of selenium dioxide and selenious acid in the presence of a solvent inert to the oxidizing action of the selenium compound.

6. The process of preparing α-methyl acrolein which comprises heating β-methyl allyl alcohol with one of the group consisting of selenium dioxide and selenious acid at a temperature of about 90° C.

7. The process of preparing unsaturated aliphatic aldehydes which comprises oxidizing the corresponding unsaturated alcohol with one of the group consisting of selenium dioxide and selenious acid in the presence of a solvent which is one of the group consisting of dioxane, aliphatic saturated alcohols and aliphatic ethers whose boiling points are higher than the aldehydes formed.

CARL T. KAUTTER.